Patented Sept. 7, 1948

2,448,985

UNITED STATES PATENT OFFICE 2,448,985

MANUFACTURE OF ABRASIVE PRODUCTS

Joseph N. Kuzmick, Clifton, and De Witt Bell, Fair Lawn, N. J., assignors to Raybestos-Manhattan, Inc., Passaic, N. J., a corporation of New Jersey No Drawing. Application August 7, 1943, Serial No. 497,851

6 Claims. (Cl. 51—298)

This invention relates to the manufacture of abrasive products containing a synthetic resin bond and particularly a modified phenol-aldehyde synthetic resin bond.

It is well known that the unmodified phenol-aldehyde synthetic resins used for bonding abrasives yield abrasive products of extreme rigidity and rather low elasticity, and also of insufficient heat sensitiveness, particularly as compared with organic bonds such as rubber. Rubber bonded wheels in service have a very smooth grinding action, largely because of the elasticity of the bond; and they are also very efficient because the bond is slightly susceptible or sensitive to grinding temperatures, resulting in a more rapid breakdown of the wheel structure as compared with more heat resistant binders such as unmodified phenol-aldehydes.

We have found that phenol-aldehyde resins may be modified by the action of synthetic rubbers hereinafter also referred to as "rubber-like synthetics" so as to make the phenol-aldehyde bonds somewhat less rigid and less heat resistant, so that, when suitably admixed with abrasive grains, abrasive products may be formed which have a cutting action similar to that of rubber bonded wheels. We have further found that these so modified phenol-aldehyde resin bonds possess such physical properties so as to make it possible and practical to process or mix the bond with abrasive grains in a dough type mixer, and to permit convenient forming of abrasive products by plastic molding equipment, such, for example, as conical rollers.

The prime objects of our present invention, therefore, comprise: (1) The manufacture of abrasive wheels bonded with synthetic resins of the phenol-aldehyde type, so modified that the resin bonded abrasive products possess cutting properties approximating those of rubber bonded abrasive products, and (2) the manufacture of such abrasive products in which the phenol-aldehyde resin bond is produced in such form and possesses such plasticity as to make it possible and practical to mix the bond with abrasive grains or grit in a dough type mixer, and to permit convenient forming of the abrasive products by plastic molding equipment, such, for example, as conical rollers.

To the accomplishment of these prime objects and other more specific objects which will hereinafter appear, our invention centers about the provision of abrasive products, the making of mixes therefor and the method of manufacturing abrasive products more particularly described in the specification and sought to be defined in the appended claims.

The essence of our present invention consists in the referred to modification of phenol-aldehyde type resins, or mixtures of such resins, intended for use as bonds for abrasive wheels, by incorporation therein of relatively low concentrations of certain rubber-like synthetic materials, in such manner, and in such concentrations, as to obtain plastic batches suitable for mixing in dough type mixers, and for forming into desired shapes by means normally used in handling plastic mixtures of abrasive grain and bond.

We have found that certain liquid resins of the phenol-aldehyde type are solvents for certain rubber-like synthetic materials such as partially polymerized chloroprene (neoprene) and copolymers of butadiene with acrylic-acid nitrile (Hycar OR). We have found that these rubber-like synthetics swell and dissolve in these liquid phenol-aldehyde resins, and within certain limits of concentration produce high viscosity, tacky solutions having sufficient body to make practical their mixing with abrasive grain in dough type mixers, and the forming of the resulting mixtures into abrasive products such as wheels, for example by rolling with conical rollers. When abrasive products so made are "cured," with or without additional pressure, the resin "sets up" to insolubility and infusibility, permanently modified by the presence of the rubber-like synthetic. The rubber-like synthetic acts to impart to the resin bond and the abrasive product a cutting action similar to that of rubber-bonded products.

As an example of a phenol-aldehyde liquid resin we prefer to use a partially formed resin such, for example, as a meta-para-cresol resin made as follows: 230 g. hexamethylenetetramine is added to 1100 g. meta-para-cresol and the mixture warmed sufficiently to dissolve the hexamethylenetetramine. This partially formed resin is of very low viscosity as compared with most liquid phenol-aldehyde resins. In some cases we prefer to carry the condensation slightly further, as by heating the mixture to 90° or 100° C. for a short time. In this latter case the viscosity, though low, is somewhat higher than in the case where only sufficient heat is used to dissolve the hexamethylenetetramine. Liquid resins made with cresylic acids or xylenols with hexamethylenetetramine instead of cresol also function satisfactorily. In general, the most suitable resin is one having a low reactivity or low degree of condensation resulting in a low viscosity product having a high solvent power for the rubber synthetic.

In some cases we find it advantageous to form this liquid resin in situ, as by using meta-para-cresol, cresylic acid, or xylenol as the solvent for the rubber-like synthetic, and adding hexamethylenetetramine during or after the mixing with the abrasive grains, relying on the temperatures in curing cycle to form the resin in situ and convert the same to infusibility.

While in some cases, we use no other phenol-aldehyde resin in addition to the liquid resins described, in many cases we find it advantageous to use in addition, a proportion of a solid, fusible A stage phenolic resin (in powdered form) adding this to the batch during the mixing with the abrasive. We also may substitute for this powdered A stage resin, a powdered B stage phenolic resin.

We have also found it desirable in some instances to use a mixture of two or more liquid resins as the solvent for the rubber-like synthetic instead of using a single liquid resin. As examples, we may use a mixture of a liquid meta-para cresol resin and a partially formed liquid phenol-formaldehyde resin or a mixture of a liquid meta-para-cresol resin and a liquid xylenol resin, etc. Various concentrations of the different liquid phenol-aldehyde resins may be used where such mixtures are employed. We may also, for purposes of convenience, use solutions of solid fusible phenol-aldehyde resins in liquid phenol-aldehyde resins for this purpose.

While, for reasons of convenience in mixing of batches and molding of abrasive products, we prefer to use as the liquid resin such resins as already described, which are liquid, and of reasonably low viscosity at room temperature, we can satisfactorily use partly formed resins made with phenols which are solid at room temperature but which fuse at slightly elevated temperatures. For example, we may substitute phenol, or resorcinol for the cresol or xylenol, carrying out our abrasive mixings at temperatures sufficient to keep these phenols and the resins formed from them in the fluid condition and thus thereby exert their solvent action on the rubber synthetic.

We find that while either partially polymerized chloroprene (such as the neoprenes) or co-polymers of butadiene with acrylic acid nitrile (such as Hycar OR) may be used with satisfactory results, the use of the former will, in general, produce "softer," that is, faster-cutting and faster-wearing wheels than the latter. Where we desire a fast-cutting, relatively soft wheel, we may use neoprene, and where we desire a wheel slightly less hard than a resinoid bonded wheel, we use Hycar OR. In general, also, the "harder" the wheel desired, the less rubber-like synthetic is used, in proportion to the resin. Furthermore, the inclusion in the mix of curing ingredients for the rubber-like synthetics tends to produce wheels harder than those made without such ingredients. It is to be understood that, according to our invention, curing ingredients in certain cases may be present, and may, in other cases, be advantageously omitted.

In most cases we prefer to use, in addition to the liquid resin and rubber-like synthetic, a proportion of powdered, solid, A stage phenol-aldehyde type resin, such, for example, as that marketed as Durite #278 resin. The proportion of this A stage powdered resin may vary from zero parts to as high as 200 parts per 100 parts of the liquid resin. In general we prefer not much over 100 parts of the powdered A stage resin per 100 parts of the liquid resin because where this ratio is too high the batch tends to become too stiff for handling conveniently at ordinary temperatures.

The proportion of rubber-like synthetic used preferably varies from 5 parts to as high as 50 parts per 100 parts of the total phenol-aldehyde resins (liquid and solid) used. The less the proportion of rubber-like synthetic used, other conditions being equal, the "harder" the wheel will be, by virtue of the lower degree of modification of the phenol-aldehyde resins. The synthetic resin comprises the preponderant and main bond component, and the rubber like synthetic acts as a secondary bond and as the described modifying agent for the resin bond.

In many cases we have found it desirable to include in the mix a proportion of a tar or pitch-like material. Such materials act, in certain types of mixes, to improve the wetting power of the plastic bond for the abrasive particles. In such cases the abrasive particles are more uniformly coated by the plastic bond during mixing, with resulting improvement in the uniformity of the finished wheels.

While the rubber-like synthetic may be dissolved in the liquid resin in any desired manner, we find it most convenient to proceed as follows: First a convenient quantity of the rubber-like synthetic, for example, Hycar OR (a co-polymer of butadiene with acrylic acid nitrile) is put into an ordinary rubber mixing mill, and "broken down" for about five minutes. Then the liquid resin, such as the meta-para cresol resin above described is slowly mixed in while the rubber synthetic is still in the mixing rolls, until about 75 parts have been added per 100 parts of the synthetic rubber. The mix, which will be fairly soft, is then transferred to an internal mixer of the Werner and Pfleiderer type. The mixer is then operated and the slow addition of liquid resin is continued until a total about 250 parts of the liquid resin have been added per 100 parts of the rubber synthetic. This mixture will now be very soft, in fact semi-fluid, and may be transferred to a dough type mixer for mixing with abrasive and other materials, if any, to be added.

The properties of the resulting abrasive product may be varied by changes made in the following controlling factors; (1) the nature of the liquid resin used, (2) the presence or absence of solid, powdered A or B stage phenol-aldehyde resin, (3) the proportion of the rubber synthetic used, (4) the presence or absence of curing agents (such as sulphur and accelerators) for the rubber synthetic material, and (5) the presence or absence of mineral fillers.

The following specific examples will illustrate the essential principles of the invention.

Example I.—The first example will illustrate the making of an abrasive mix and an abrasive product employing meta-para-cresol resin for a liquid resin and Hycar OR for the synthetic-like rubber and in which there is incorporated a dry phenol-aldehyde resin. We take 100 parts by weight of Hycar OR (the co-polymer of butadiene and acrylic acid-nitrile) and break the same down (for five minutes) in an ordinary rubber mixing mill. With the Hycar kept on the mill, we slowly add continually mixing with the Hycar, 75 parts of a meta-para-cresol resin prepared as described above. The resulting batch is now removed from the mill, and transferred to an internal mixer of the Werner & Pfleiderer type. Mixing is started and there is slowly added an additional 175 parts of the meta-para-cresol resin, mixing being continued until a smooth viscous mix is obtained. This mixing generates a certain amount of heat. Too great a development of heat is to be avoided to inhibit any partial "curing" of the resin. Too rapid addition of the meta-para-cresol resin should also be avoided to prevent the batch from becoming lumpy. This batch, when it has been mixed until smooth and uniform, is then transferred to a dough type mixer, and 4400 parts of abrasive grain of desired mesh size added, and the mixing started. During this mixing the following ingredients are added: 200 parts of a powdered solid A stage phenol-formaldehyde resin, 200 parts pulverized cryolite (filler), 20 parts slaked lime, 35 parts sulfur, and 1 part of Grasselerator 808, an aldehyde-amine accelerator. The mixing in the dough mixer is then continued until the added materials are thoroughly dispersed, and the abrasive particles substantially uniformly coated. The batch will be somewhat warm, depending upon time of mixing and speed of operation of mixer. The batch is then removed and formed in molds as by means of conical rollers, pressed in the mold at, for example, 1000 p. s. i. of wheel surface, and cured by any one of the known curing methods employed for rubber-bonded or resin bonded wheels.

This example illustrates the attainment of the various objects of the invention. The rubber-like synthetic is dissolved by and swells in the liquid synthetic resin. A bond is produced which is tacky, of high viscosity and which has sufficient body to make practical mixing of the bond with abrasive grains or grit in dough type mixers. The resulting mix is in a condition to be readily molded by such plastic molding equipment as conical rollers. The resulting mix is curable in equipment and by methods standard in the art and used for the making of either resin bonded or rubber bonded abrasive products. The resin bond is the main or preponderant bond component and the rubber-like synthetic acts as a secondary bond component and as the modifying agent for the resin bond. The resulting phenol-aldehyde resin bond and the abrasive product possess a cutting action desirably similar to that of rubber bonded wheels, the same being less rigid and less heat resistant than abrasive products made with unmodified phenol-aldehyde bonds.

*Example II.*—This example will illustrate the making of an abrasive mix and an abrasive product of the nature described in Example I, but in which the meta-para-cresol resin is formed in situ during the curing cycle.

We proceed as in Example I, except that we substitute meta-para-cresol (62 parts) for the 75 parts of meta-para-cresol resin added on the mill in Example I, and meta-para-cresol (145 parts) for the 175 parts of cresol resin added in the W. & P. mixer. Then, during mixing with abrasive and other ingredients, in the dough mixer, we add 43 parts of hexamethylenetetramine. The cresol and hexa condense during cure forming the resin "in situ" in the batch. In some cases we prefer this procedure because the solution of rubber-like synthetic in cresol is of somewhat lower viscosity than the solution in the partially formed meta-para-cresol resin.

*Example III.*—This example will illustrate the making of an abrasive mix and an abrasive product following the procedure given with Example I, but in which a tar or pitch is used to improve the wetting power of the plastic bond for the abrasive articles.

We proceed as in Example I, except that 50 parts of a water-gas tar or pitch is incorporated into the batch at any time during its mixing, on the mill, in the W. & P. mixer, or in the dough mixer. We prefer to add the tar or pitch to the mixture in the W. & P. mixer prior to the incorporation of the additional liquid resin.

*Example IV.*—This example will illustrate the making of an abrasive mix and an abrasive product according to the principles of the present invention, in which neoprene is employed as the synthetic rubber.

We proceed as in Example I, except that we substitute a partially polymerized chloroprene, such as neoprene GN or neoprene KN for the Hycar, and substitute 10 parts magnesium oxide and 5 parts zinc oxide for the lime, sulfur, and accelerator.

*Example V.*—This example will illustrate the making of an abrasive mix and an abrasive product according to the principles of the present invention, in which a phenol instead of a cresol resin is used and also in which the resin is formed in situ during the curing cycle.

We proceed as in Example II, with the following modifications:

(a) We use 54 parts of phenol in place of the 62 parts of cresol added on the rubber mill;

(b) We use 126 parts of phenol in place of the 145 parts of cresol added in the W. & P. mixer;

(c) By any suitable means we control the temperature so that the batch during mixing and forming remains sufficiently warm to keep the phenol in a fluid state—for example, over 120° F.

*Example VI.*—This example will illustrate the use of a xylenol resin also produced in situ, in substitution for a meta-para-cresol resin.

We proceed as in Example II, but substitute a xylenol for meta-para-cresol in preparation of the liquid resin. 48 g. xylenol for 62 cresol; 112 g. xylenol for 145 cresol.

*Example VII.*—This example will illustrate the use of a mixture of liquid resins.

We proceed as in Example I, but use 50/50 (moles) meta-para-cresol and a xylenol in preparation of the liquid resin.

*Example VIII.*—This example will illustrate the use of a liquid phenol-formaldehyde resin in addition to the meta-para-cresol resin as the solvent.

We proceed as in Example I, except that, after the addition of the meta-para-cresol in the W. & P. mixer, we add 100 parts of a phenol-formaldehyde resin in the liquid state.

*Example IX.*—This example will illustrate the practicing of the invention omitting the vulcanizing ingredients for the rubber-like synthetic.

We proceed as in Example I, except that (a) we use 50 parts of Hycar OR instead of 100 parts, and (b) we omit the lime, sulfur and accelerator.

*Example X.*—This example will illustrate the addition of a B stage phenolic resin in carrying out the principles of the invention.

We proceed as in Example I, except that we substitute 200 parts of the B stage phenolic resin in powdered form for the powdered solid A stage resin called for in Example I.

The manner of making abrasive products bonded with a rubber-like synthetic modified phenol-aldehyde resin embodying the principles of our present invention, and the advantages thereof, both from the standpoints of manufacture of products and the improved results obtained, will, it is believed, be fully apparent from the above detailed description thereof. It will be further apparent that changes may be widely made within the purview of the above description, without departing from the spirit of the invention defined in the following claims.

We claim:

1. The method of making an abrasive product bonded with a phenol-aldehyde synthetic resin modified by a rubber-like synthetic, which consists in making a bond by mixing a phenol-aldehyde resin component in the liquid state with a rubber-like synthetic selected from the group consisting of a partially polymerized chloroprene and a copolymer of butadiene and acrylic-acid nitrile, the rubber-like synthetic being dissolved and swelled by the liquid resin and the rubber-like synthetic acting to modify the bond characteristics of the resin, in mixing said bond with abrasive grains and in then shaping and curing the mix.

2. The method of claim 1 in which the phenol-aldehyde resin is the preponderant bond component and in which the rubber-like synthetic component comprises a partially polymerized chloroprene.

3. The method of claim 1 in which the phenol-aldehyde resin is the preponderant bond component and in which the rubber-like synthetic component comprises a copolymer of butadiene and acrylic-acid nitrile.

4. The method of claim 1 in which a water-gas tar pitch is added to the mix to improve the wetting power of the bond for the abrasive grains.

5. The method of making an abrasive product bonded with a phenol-aldehyde synthetic resin modified by a rubber-like synthetic, which consists in making a bond by mixing a phenol-aldehyde resin component in the liquid state with a rubber-like synthetic selected from the group consisting of a partially polymerized chloroprene and a copolymer of butadiene and acrylic-acid nitrile and with a fusible dry phenol-aldehyde resin, the rubber-like synthetic being dissolved and swelled by the liquid resin and the rubber-like synthetic acting to modify the bond characteristics of the resin, in mixing said bond with abrasive grains and in then shaping and curing the mix.

6. The method of claim 5, in which the phenol-aldehyde resin is the preponderant resin component.

JOSEPH N. KUZMICK.
DE WITT BELL.

REFERENCES CITED

The following references are of record in the file of this patent:

UNITED STATES PATENTS

| Number | Name | Date |
|---|---|---|
| 1,932,104 | Hepp | Oct. 24, 1933 |
| 1,950,641 | Upper | Mar. 13, 1934 |
| 2,122,691 | Kuzmick | July 5, 1938 |
| 2,194,350 | Berg | Mar. 19, 1940 |
| 2,229,880 | Allison | Jan. 28, 1941 |
| 2,334,526 | Allison | Nov. 16, 1943 |